(12) United States Patent
Baird

(10) Patent No.: US 11,654,382 B2
(45) Date of Patent: *May 23, 2023

(54) OVERPRESSURE LEAK DETECTION LUG

(71) Applicant: Michael T. Baird, Temecula, CA (US)

(72) Inventor: Michael T. Baird, Temecula, CA (US)

(*) Notice: Subject to any disclaimer, the term of this patent is extended or adjusted under 35 U.S.C. 154(b) by 215 days.

This patent is subject to a terminal disclaimer.

(21) Appl. No.: 17/198,768

(22) Filed: Mar. 11, 2021

(65) Prior Publication Data

US 2021/0205743 A1 Jul. 8, 2021

Related U.S. Application Data

(60) Continuation of application No. 16/263,723, filed on Jan. 31, 2019, now Pat. No. 10,987,618, which is a division of application No. 15/144,656, filed on May 2, 2016, now Pat. No. 10,226,722.

(60) Provisional application No. 62/158,474, filed on May 7, 2015.

(51) Int. Cl.
*B01D 35/143* (2006.01)

(52) U.S. Cl.
CPC ...... *B01D 35/143* (2013.01); *B01D 2201/291* (2013.01); *B01D 2201/302* (2013.01); *B01D 2201/4015* (2013.01); *B01D 2201/4053* (2013.01)

(58) Field of Classification Search
CPC .............................. B01D 35/30; B01D 35/143
See application file for complete search history.

(56) References Cited

U.S. PATENT DOCUMENTS

| | | |
|---|---|---|
| 4,203,385 A | 5/1980 | Mayer et al. |
| 4,715,231 A | 12/1987 | Lee, II et al. |
| 4,904,302 A | 2/1990 | Shimomura |
| 5,437,188 A | 8/1995 | Frantom et al. |
| 5,456,830 A | 10/1995 | Stanford et al. |
| 5,486,288 A | 1/1996 | Stanford |
| 6,193,884 B1 | 2/2001 | Magnusson et al. |
| 7,107,928 B2 | 9/2006 | Chasteen et al. |
| 7,135,113 B2 | 11/2006 | Bassett et al. |
| 7,638,042 B2 | 12/2009 | Astle et al. |
| 8,216,463 B1 | 7/2012 | Baird |
| 8,790,512 B2 | 7/2014 | Wilder et al. |
| 10,226,722 B1 | 3/2019 | Baird |
| 10,987,618 B1 * | 4/2021 | Baird .................. B01D 35/143 |
| 2013/0180898 A1 | 7/2013 | Chajec et al. |
| 2013/0298378 A1 | 11/2013 | Suri |

* cited by examiner

*Primary Examiner* — Benjamin M Kurtz
(74) *Attorney, Agent, or Firm* — Stetina Brunda Garred & Brucker

(57) ABSTRACT

A filter cartridge with a longitudinal axis has mounting lugs engaging mating manifold flanges in an appliance to hold the cartridge in the appliance with fluid flowing through the cartridge at a line pressure of X psi while the lugs are designed for a greater, rated pressure Y. Each lug has a deformable portion and an aligned stop portion that are axially aligned. A distance d separates each stop portion from the axially aligned deformable portion. The deformable portion is below the stop portion and located to contact the manifold flange during use. The deformable portion permanently deforms above the rated pressure Y and below a qualification pressure Z that is at least twice the pressure X.

11 Claims, 10 Drawing Sheets

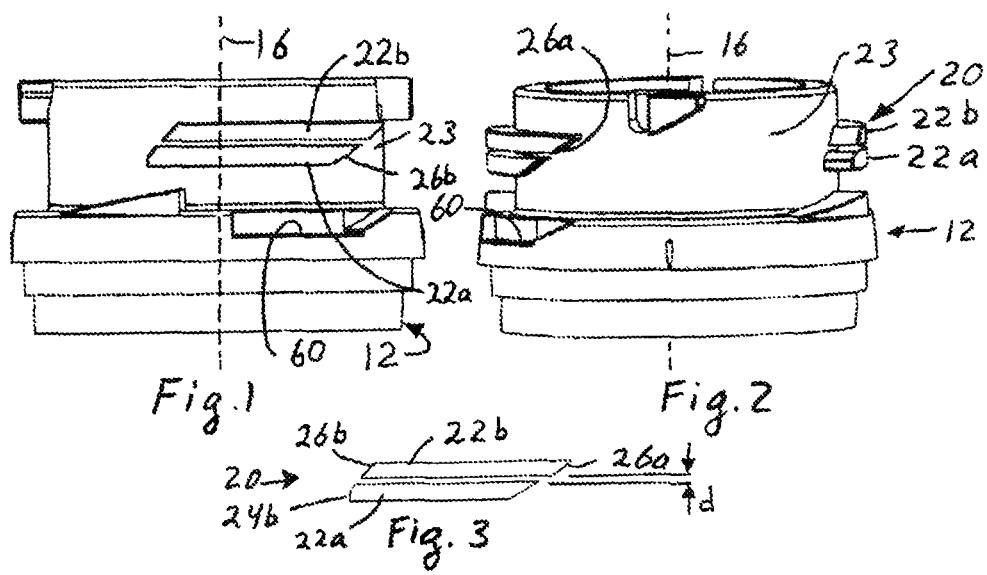
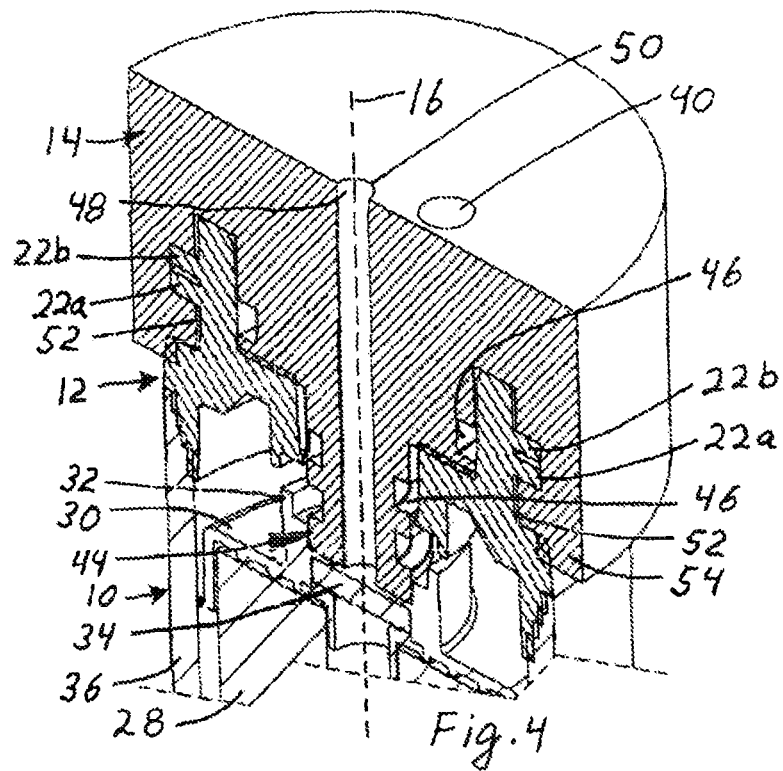

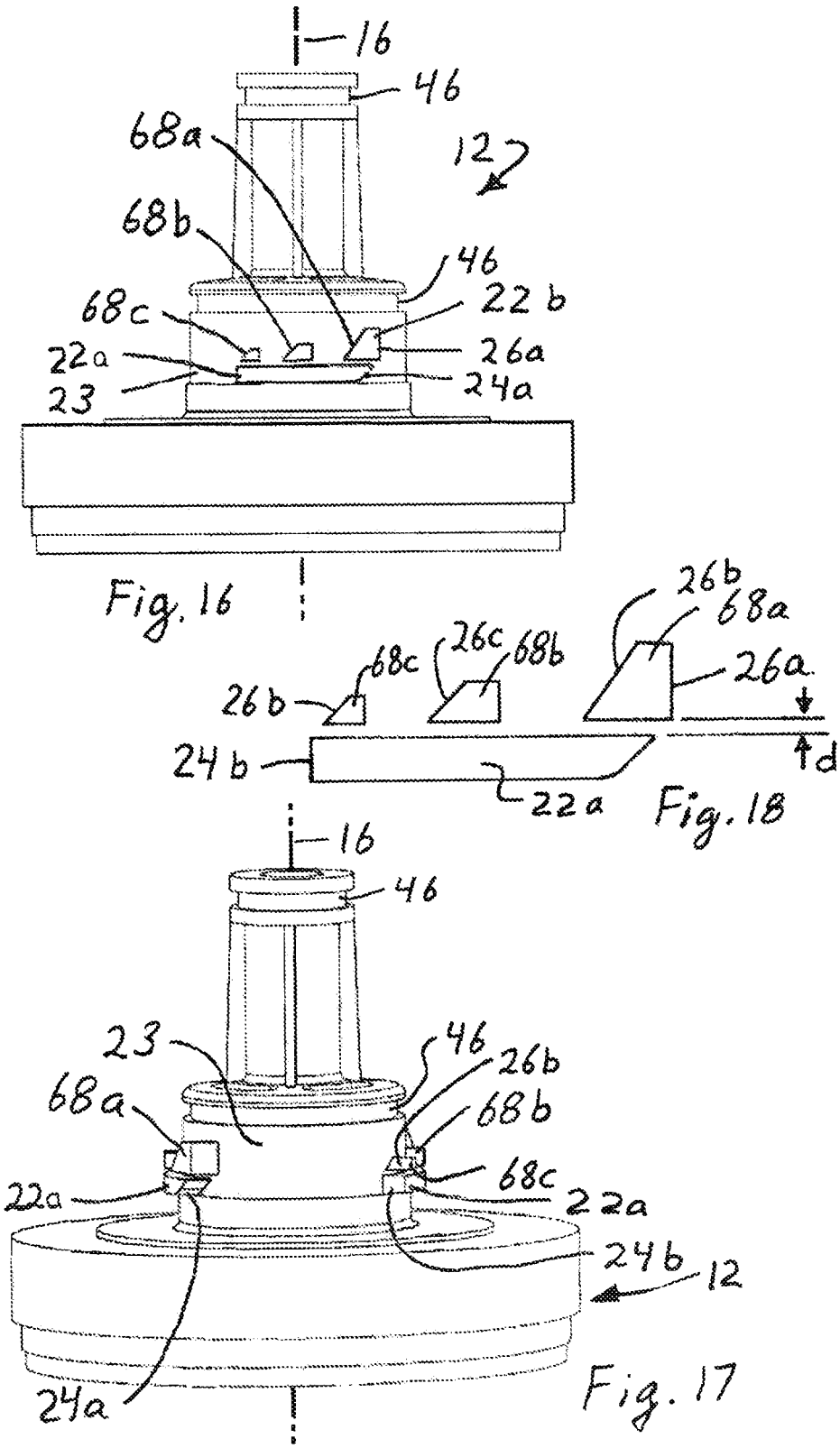

OVERPRESSURE LEAK DETECTION LUG

CROSS-REFERENCE TO RELATED APPLICATIONS

This application is a continuation of and claims priority to U.S. Non-Provisional patent application Ser. No. 16/263,723 filed on Jan. 31, 2019, which is a divisional patent application of and claim priority to U.S. Non-Provisional patent application Ser. No. 15/144,656, now U.S. Pat. No. 10,226,722, filed on May 2, 2016, which claims priority to Provisional Patent Application Ser. No. 62/158,474, filed May 7, 2015, the entire contents of each of the foregoing are incorporated herein by reference.

BACKGROUND

Existing water filter cartridges have an elongated housing for filter media with a neck that fits into a manifold in the appliance. The neck of the filter cartridge or the top part of the filter cartridge typically has a bayonet mount with inclined (cam) ends that rotatably engage a mating flange in the manifold so that rotating the filter cartridge locks the cartridge into position during use. When the manifold allows pressurized water to flow into and through the filter cartridge the water exerts an axial force on the cartridge that wants to push the filter cartridge out of the manifold. The bayonet mount resists this ejection pressure and prevents the water pressure in the manifold from pushing the filter cartridge out of the manifold.

Sometimes the filter cartridge splits open because the line pressure in the manifold is at too high of a pressure or because repeated pressure variations (water hammer) gradually weaken the filter cartridge housing, causing it to break. High line pressures arise because the municipal water line often carries water at pressures of 60-120 psi, with a home pressure regulator typically being located between the municipal water line and the home in which the appliance is located for a more typical line pressure of about 60-80 psi. These home pressure regulators typically regulate the pressure in residential water lines to about 60 psi, but the selected pressure is adjustable. These home pressure regulators wear and may cause excessive line pressure damaging to appliance water filters, and sufficiently damaging that the housings on appliance water filters may rupture or leak.

Moreover, even at 60 psi, valves associated with various residential and office items that use water, such as sprinklers, toilets, washers, faucets, showers, bathtubs, water heaters and outdoor hose bibs may have valves configured to operate various different pressures so that the opening and especially the closing of these valves causes a sudden back pressure in the residential water line, resulting in water hammer. The pressures from water hammer can be very high, and can occur with high frequency. Water hammer may occur with sufficient frequency and magnitude that the water filter cartridges rupture or that the home pressure regulator is damaged and allows increased line pressure to the home.

When a water filter cartridge ruptures or leaks, water can flood the surrounding area, causing damage to the affected area commensurate with the volume and duration of the leak and the location of the lead. The result can be very large damage claims by the homeowner. Since there is currently no reliable way to show the rupture of a water filter cartridge was caused by too much line pressure from the appliance's manifold, the cartridge manufacturer may sometimes be held liable for the water damage when the failure was not caused by the filter cartridge. To help avoid such ruptures, leaks and water damage, filter cartridges are tested to at 300 psi and sometimes up to 500 psi, even though the cartridge is rated at 60 psi for operational uses. Typically, the rated operating pressure is qualification tested to three times that rated pressure. But despite this overpressure testing, cartridge failures still occur. There is thus a need to help determine whether the failure of a water filter arises from overpressure in the water supplied to the filter. There is a further need to help determine whether the failure of a water filter arises from water hammer. There is a further need to help determine whether the failure of a water filter is due to a defect in the filter or something outside the filter. There is a still further need to help determine the source of filter cartridge failures while still allowing the cartridge to be tested using pressures greater than the represented operating pressure at which the filter cartridge is advertised and sold.

BRIEF SUMMARY

An improved filter cartridge has an outwardly extending connector such as a bayonet mount, which has a first permanently deformable portion sized and configured to permanently deform above a rated operating pressure of the filter cartridge. A second stop portion is located adjacent the first stop portion and is sized and configured to maintain a watertight seal at the higher test pressure of 300-500 psi when the first permanently deformable portion deforms. If a water leak occurs and the first deformable portion is permanently deformed the deformation indicates that the cartridge met its specified pressure rating and the failure arose from applying a pressure that exceeded the rated pressure, the manifold pressure—so the cartridge manufacturer is not at fault for the leak. The second stop limits the deformation and axial movement of the cartridge when overpressure occurs so that the cartridge can pass the qualification test pressure of 300-500 psi without leaking. The second stop may be sufficiently strong by itself to limit axial movement and leakage or the combination of the second stop with a permanently deformed first stop may be sufficiently strong to limit axial movement and leakage. The filter cartridges may move axially without moving the cartridge seals out of sealing contact with the manifold surface and the total movement of the filter cartridge is thus less than needed to move the filter cartridge seals out of contact with the manifold and allow fluid leakage.

The first and second stop portions of the connecting mount may be spaced apart a short distance of about 0.03 inches (about 7-8 mm) with the bottom stop portion that abuts the manifold during use to resist expulsion from the manifold having a thickness of about 0.09 inches (about 2.3 mm) when the lugs are made of polypropylene. Thus, the slot separating the first and second lower and upper to form a slot about 0.03 inches (about 7-8 mm) wide along the longitudinal axis of the filter and manifold to show permanently deformation and movement of the first stop with the second stop configured to maintain a water tight seal on the cartridge during high pressure testing. Alternatively, a connecting mount with a single stop may be provided with a non-linear stiffness such that the stiffness increases with the deformation of the mount and with the bottom of the bayonet mount showing permanently deformation above the rated pressure. The connecting mounts are preferably a bayonet mount. The permanently deformation indicator is especially useful for water filters, but the design and invention are not so limited and may apply to other filters.

There is thus advantageously provided a filter cartridge for an appliance having a manifold into which the filter cartridge is inserted during use where the manifold has a flange that is configured to rotatably engage a bayonet mounting lug on the cartridge to hold the filter cartridge in the manifold during use. The filter cartridge further has a distal end and a longitudinal axis. The filter cartridge is advantageously designed for a nominal line pressure of X psi. The filter cartridge includes a filter cap connected to a filter housing and enclosing a filter media to form a filter cartridge. The filter cap has an inlet and outlet both of which cooperate with the housing to pass unfiltered water from the inlet through the filter media and to the outlet. The filter cartridge has a rated line pressure Y that is greater than X psi.

The filter cartridge also has at least two outwardly extending mounting lugs each configured to mate with a different flange of the manifold to hold the filter in the manifold during use. Each lug has a deformable portion and an aligned stop portion that are axially aligned. Each stop portion is separated from the axially aligned deformable portion by an axial distance d. The deformable portion is below the stop portion during use and is located to contact the flange of the manifold during use. The deformable portion is configured to permanently deform above the rated pressure Y and below a qualification pressure Z that is at least twice the pressure X.

In further variations, at least a portion of the deformable stop permanently deforms at a pressure between about 100 psi and about 200 psi in the filter. The deformable stop may permanently deform at a pressure between about 100 psi and about 300 psi in the filter. The distance d is preferably less than about 0.08, and more preferably about 0.030 inches when the deformable stop is made of polyethylene. The stop portion and the deformable portion may extend circumferentially the same distance. The stop portion and deformable portion are advantageously made of polyethylene. The qualification pressure Z is preferably less than 10 times the line pressure X pressure and advantageously less than five times the line pressure X pressure. Ideally, the advertised maximum operating pressure Y is above the expected line pressure X and the qualification test pressure Z is two or three times the rated operating pressure Y, and more preferably about three times the rated operating pressure Y. The stop portion may include a plurality of stop segments, each spaced a distance d from an axially aligned deformable portion.

In further variations the deformable portion may have a curved bottom surface. Advantageously, the deformable and stop portions each have a leading end and at least one of those leading ends is inclined in a direction to help the deformable section mate with the flange during use. Moreover, the deformable portion may connect to the filter cap at a radial distance that is greater than where the stop portion connects to the filter cap. Preferably, the distance between the deformable and stop portions is between about 0.02 and 0.04 inches, especially when the parts are made of polyethylene. More preferably the distance between the deformable and stop portions is between about 0.025 and 0.035 inches, with a preferred distance of 0.030 inches, especially when the parts are made of polyethylene.

There is also provided a filter cap for a water filter for an appliance having a manifold into which the filter cap is inserted during use. The manifold has a plurality of flanges each configured to rotatably engage a different bayonet mounting lug on the filter to hold the filter in the manifold during use. The filter cap may have a distal end and a longitudinal axis. The water filter is designed for a nominal line pressure of X psi. The filter cap includes at least one outwardly extending mounting lug configured to mate with one of the flanges of the manifold during use. The at least one mounting lug has a deformable portion and a stop portion separated by axial distance d. The deformable portion is axially aligned with but below the stop portion during use. The deformable portion is configured to permanently deform above a rated pressure Y of the filter cartridge to which the filter cap is fastened during use. The rated pressure Y is greater than line pressure X and below a qualification pressure Z, with the qualification pressure Z being at least about twice the pressure X and preferably two or three times the rated pressure Y, and less preferably Z is two or three times the expected line pressure X.

The filter cap may have the same variations as described above for the filter cartridge, especially wherein the distance between the deformable and stop portions is between about 0.02 and 0.04 inches, and more preferably about 0.025 and 0.035 inches and even more preferably about 0.03 inches—especially when the portions are made of polyethylene.

BRIEF DESCRIPTION OF THE DRAWINGS

These and other features and advantages of the filter cartridge permanently deformation indicator will become more apparent in light of the following discussion and drawings, in which like numbers refer to like parts throughout, and in which:

FIG. 1 is a front plan view of a first filter cap with first mounting lugs suitable for use with a filter cartridge with the back view being a mirror image thereof;

FIG. 2 is a perspective view of the filter cap of FIG. 1 rotated about 90 degrees;

FIG. 3 is a view of the mounting lugs of FIG. 1;

FIG. 4 is a sectional view of a filter cartridge having the filter cap of FIG. 1 mounted thereon and inserted into a manifold or head;

FIG. 16 is a front plan view of another embodiment of a filter cap having mounting lugs where the mounting lugs form keys, with the opposing back view being a mirror image of the front view;

FIG. 17 is an upper perspective view of the filter cap of FIG. 16 rotated about 90 degrees; and FIG. 18 is plan view of the mounting lugs of FIG. 16;

DETAILED DESCRIPTION

Figure 5:
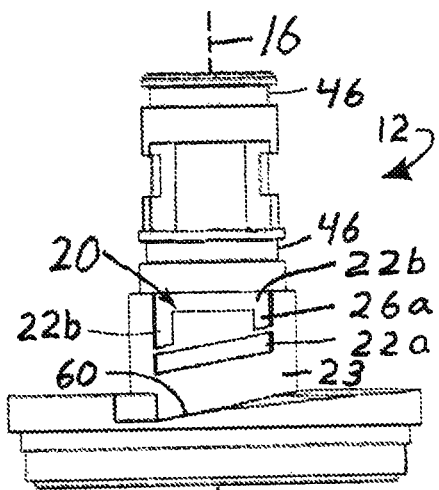
FIG. 5 is a front plan view of a filter housing with a second embodiment of permanently deformable mounting lugs suitable for use with a filter cartridge with the back view being a mirror image thereof.
Figure 6:
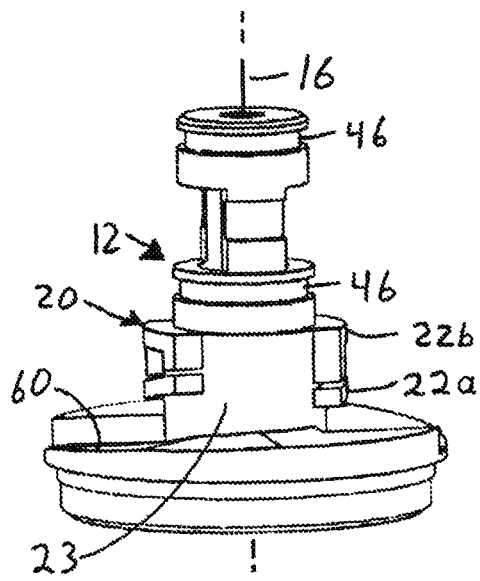
FIG. 6 is right side view of the filter housing of FIG. 5.
Figure 7:
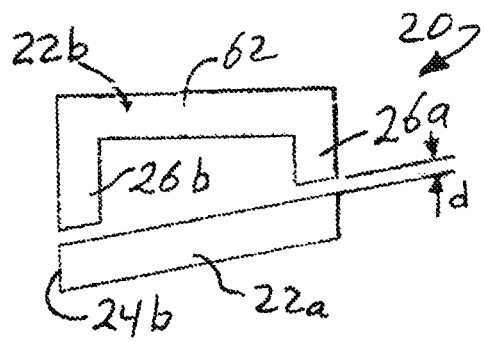
FIG. 7 is a perspective view of the filter housing of FIG. 5 rotated about 90 degrees.
Figure 8:
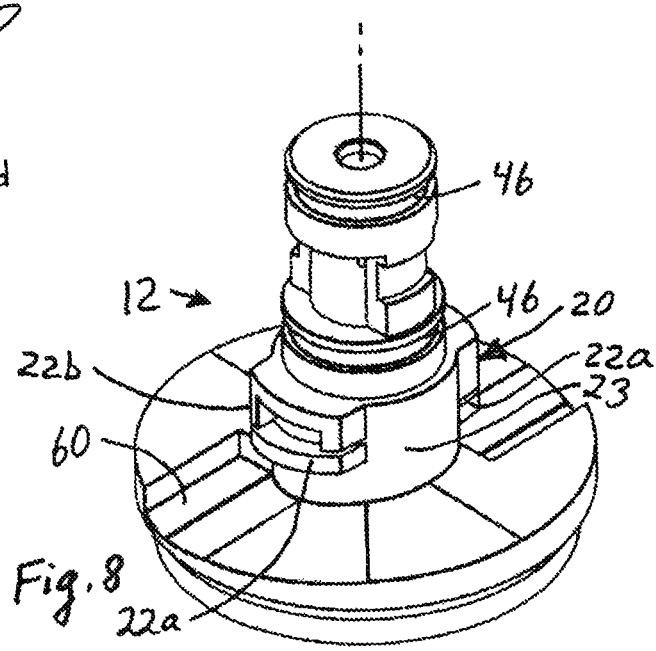
FIG. 8 is a top perspective view of the filter housing of FIG. 5.

Referring to FIGS. 1-4, a filter cartridge 10 has a filter cartridge cap 12 (also referred to as the filter cap 12) fastened to one end, with the filter cap 12 configured to fit into and be releasably retained in a fluid head or manifold 14 of an appliance (not shown). The filter cartridge 10 is inserted into the manifold 14 along a longitudinal axis 16, with the cartridge 10 being held in the manifold 14 by sets of mounting lugs 20 each having a first permanently deformable portion 22a (also referred to as the first lug portion 22a or the first portion 22a or the deformable portion 22a) and a second stop portion 22b (also referred to as the second lug portion 22b or the second portion 22b or stop portion 22b) with first permanently deformable portion 22a having a leading end 24a and a trailing end 24b and the second stop portion 22b having a leading end 26a and a trailing end 26b. The first and second portions 22a, 22b are separated an axial distance d, preferably separated by a straight channel forming a gap of about 0.03 inches. The lugs 20 are preferably located on and extend from the outer surface of the filter cap 12 but could be on the body of the cartridge 10. In the depicted embodiments the lug portions 22a, 22b are located on and extend from the outer, cylindrical surface of an outer neck 23. There are preferably at least two sets of mounting lugs 20 advantageously equally spaced around the circumference or periphery of the filter cap 12. From two to four lugs are typically equally spaced around the periphery of a filter cap 12 or the filter cartridge 10, with at least two diametrically opposed lugs being common and with more being used as the size of the filter increases or as the expulsion force from the manifold 14 increases.

As used herein, the relative terms above, below, top and bottom are with respect to the longitudinal axis 16 which extends through the parts when assembled. The relative terms inner, outer, inward, outward are the respective directions or positions relative to the longitudinal axis 16 of the parts when assembled. The manifold 14 and the filter cartridge 10 have the same longitudinal axis 16 when separated as when assembled.

Before going into details on the first and second portions 22a, 22b, the basic structure in which those stop portions are used is first described as shown in FIG. 4. The filter cartridge 10 has a filter media or element 28 shown as a tubular, cylindrical filter, typically of carbon. The filter media 28 has a filter end piece 30 that forces water radially through the cylindrical wall of the filter media 28. The filter end piece 30 is shown with a tubular neck 32 surrounding in fluid communication with a central, cylindrical cavity of the filter media 28 through a fines filter 34. A filter housing 36 encloses the filter media 28 with a space between the filter media 28 and housing 36 for water to flow. The housing 36 is shown as cylindrical, and has a closed end (not shown). A fluid flow path is formed through the outside of the filter end piece 30 but inside the filter cartridge cap 12, around the outside of the filter media 28, through the media 28 and into the central cavity of the media and then out the neck 32 of the filter end piece 30. The flow path could be in the opposite direction. The filter cap 12 is fastened to one end of the housing 36 by various means, with the use of adhesives, melting by friction welding, sonic welding or spin welding being commonly used.

The head or manifold 14 is configured to receive the filter cap 12 and hold it in place while water flows through the manifold 14 and the filter cartridge 10 to filter the water. In the depicted embodiment the flow path is through a first manifold opening 40 and various internal passages 42 (some of which may be partially formed in cooperation with the filter cap 12) to the space between the inside of the cartridge filter cap 12 and the outside of the neck 32. The manifold 14 has a protruding male nozzle 44 configured to fit into the neck 32 of the filter cartridge 10, with O-ring seals 47 (such as ring seals 47 depicted in FIGS. 23 and 23) located in the grooves or glands 46 to form the fluid flow paths into and out of the filter cartridge 10. A second manifold opening 50 is in fluid communication with an internal passage 48 that extends through the manifold 14 and the nozzle 44 to form a fluid path for water flowing out of the filter cartridge 10 through the neck 32. The direction of the fluid flow through the manifold 14 and the filter cartridge 10 may be reversed.

The manifold 14 has a flange 52 located below a space configured to receive each of the lugs 20 during use. The lugs 20 form a bayonet mount to releasably connect the filter cartridge 10 to the manifold 14 so the basic construction of the broadly described parts may be known, but not the details of the lugs 20 described herein. The manifold 14 has an internal passage (not shown) allowing the lugs 20 to be inserted into the manifold 14 along axis 16, with rotation of the filter cartridge 10 and the lugs 20 about the axis 16 to engaging the lower, first lug portion 22a with the top of the mating flange 52 that extends inward and surrounds a recess configured to receive at least a portion of the filter cap 12. Typically, there are as many flanges 52 as there are first portions 22a of the lugs 20. The flanges 52 are typically in the same plane orthogonal to the axis 16, and may be formed as a single flange with recesses cut out or cast or molded to allow passage of the lugs 20 through the recesses passage. The flanges 52 are typically formed in a skirt 54 of the manifold 14 and extend radially inward, although the flanges 52 may have a portion that is slightly inclined along a length of the axis 16 to resemble a screw thread and facilitate rotation and axial movement of the cartridge 10.

Referring to FIGS. 1-4, the lugs 20 in this embodiment are in a plane generally orthogonal to the axis 16 so the lugs 20 are horizontal when the axis 16 is vertical. The leading ends 24a, 26a of the lug portions 22a, 22b may be inclined to form cam surfaces that make it easier to rotate the first lug portion 22a onto the top of the mating flange 52. In use, the filter cartridge 10 is inserted into the manifold 14 with the lugs aligned with axial paths through the manifold 14. When the lugs 20 are above or slightly above the top of the flanges 52, the cartridge 10 is then rotated to engage the lugs 20 with the flanges 52. The cartridge 10 is rotated (usually clockwise) to engage the first lug portion 22a with the top of the mating flange 52 and to align the fluid passages in the manifold 14 with the passages through the filter cartridge 10 so unfiltered water from the manifold 14 may enter the filter cartridge 10, pass through the filter media 28, and return to the manifold 14 for use by the appliance to which the manifold 14 is connected.

The fluid passages are aligned because the appliance is preferably a household appliance such as a refrigerator, water dispenser, soda machine or other device using filtered water. But the manifold 14 could be on any system and the filter cartridge 10 is not limited to filtering water. When the filter media 28 in the filter cartridge 10 is depleted the cartridge 10 is rotated the opposite direction (usually counterclockwise) than when it was installed to align the lugs 22 with gaps in the flanges 52 to permit passage of the lugs 20 through those gaps and removal of the filter cartridge 10 from the manifold 14.

The lugs 22 and the flanges 52 are aligned to keep the filter cartridge 10 retained in the manifold 14 during use. The first lug portion 22a has a lower surface that contacts the mating flange 52 and an upper surface that is spaced apart from the bottom surface of the second lug portion 22b. In some manifolds 14 the lugs 20 fit into an annular space with the top of the lug adjacent the top of the annular space as shown in FIG. 4, in order to restrain movement of the cartridge 10 in both directions along the axis 16.

The first portion 22a has a length and thickness and material selected so that it does not permanently deform in the direction of axis 16 at a predetermined pressure preferably corresponding to an advertised rated line pressure, typically about 60 psi to about 100 psi for residential and commercial water filters, but permanently deforms at a pressure slightly above those rated pressures. Random filters are tested to a higher qualification testing pressure which permanently deforms the first portion 22a, as discussed later. The rated pressure rating is preferably the pressure for which the cartridge is rated for actual use. If the rated pressure for the filter cartridge 10 is 60 psi then the first portion 22a is configured to permanently deform at above 60 psi and preferably within about 10% to about 30% of that rated pressure. If the filter cartridge 10 is rated for 100 psi, the first portion 22a is configured to permanently deform at above 100 psi, and preferably within about 10% to about 30% of that rated pressure.

For the configuration of FIGS. 1-4, a first portion 22a made of polypropylene and having an axial thickness of about 0.09 inches (about 2.3 mm) and a circumferential length of about 0.5-0.8 inches is believed suitable for a pressure rating of 60 psi for a filter cartridge 10 used with a residential refrigerator. The first portion 22a is advantageously thick enough that allows the water filter cartridge 10 to be pressure tested to the rated line pressure for quality assurance without permanent deformation, and to be tested to higher quality control pressures causing permanent deformation, with cartridges showing visual axial permanent deformation of the first portion 22a during such higher pressure testing for quality control purposes.

The first lug portion 22a is separated from the second lug portion 22b an axial distance d sufficient so that at least some of the first portion 22a can be visually observed to have permanent axial deformation (along axis 16). As the first lug portion 22a continues to be permanently deformed axially it will contact the second portion 22b which will provided increased resistance to axial movement of the first lug portion 22a.

The deformable portion 22a permanently deforms in shear at the juncture of the portion 22a with the neck 32. It is the shear stress for permanent deformation and the corresponding physical deformation to achieve that permanent shear stress that are the guiding parameters for configuring the deformable portion 22a relative to the pressure at which the deformation occurs. The deformable portion 22a usually connects to a cylindrical part of the filter cap 12, but some filter caps have oval nozzle portions so the deformable portion 22a and stop portion 22b could connect to non-circular sections of the filter cap 12. The deformable portion 22a advantageously extends a uniform distance from the neck 23 so as to have a circular periphery. The distance between the first and second lug portions 22a, 22b is advantageously selected so the first portion 22a does not shear completely off and separate from the filter cap 12 or the housing 36 to which it is attached. The added resistance of the second lug portion 22b, or if complete shear occurs, the sole resistance of the second lug portion 22b, stops further movement of the first lug portion 22a. An axial separation of about 0.03 inches (about 7.6 mm) between the top of the first lug portion 22a and the bottom of the second lug portion 22b is believed suitable for the described embodiment. Smaller axial separations of about 0.05 to 0.015 is believed suitable but make it difficult to injection mold, and while the separation could be cut using lasers, water pressure, or bladed instruments or saws, that requires an extra manufacturing step that increases costs. The smaller axial separations also make it harder to visually ascertain permanent deformation. Larger axial separations of about 0.035 to 0.045 or even larger are believed suitable but the ring seals 47 between the filter cap 12 and manifold 14 may leak and the large deformation may completely shear off the first portion 22a, which may be permissible in some situations where the sheared portion remains interposed between the flange 52 and the second portion 22b, but is not desirable. These deformations are for water filter cartridges 10 with lugs 20 made of various plastics and other applications may alter the dimensions and spacing between the first and second portions 22a, 22b.

Figure 22:
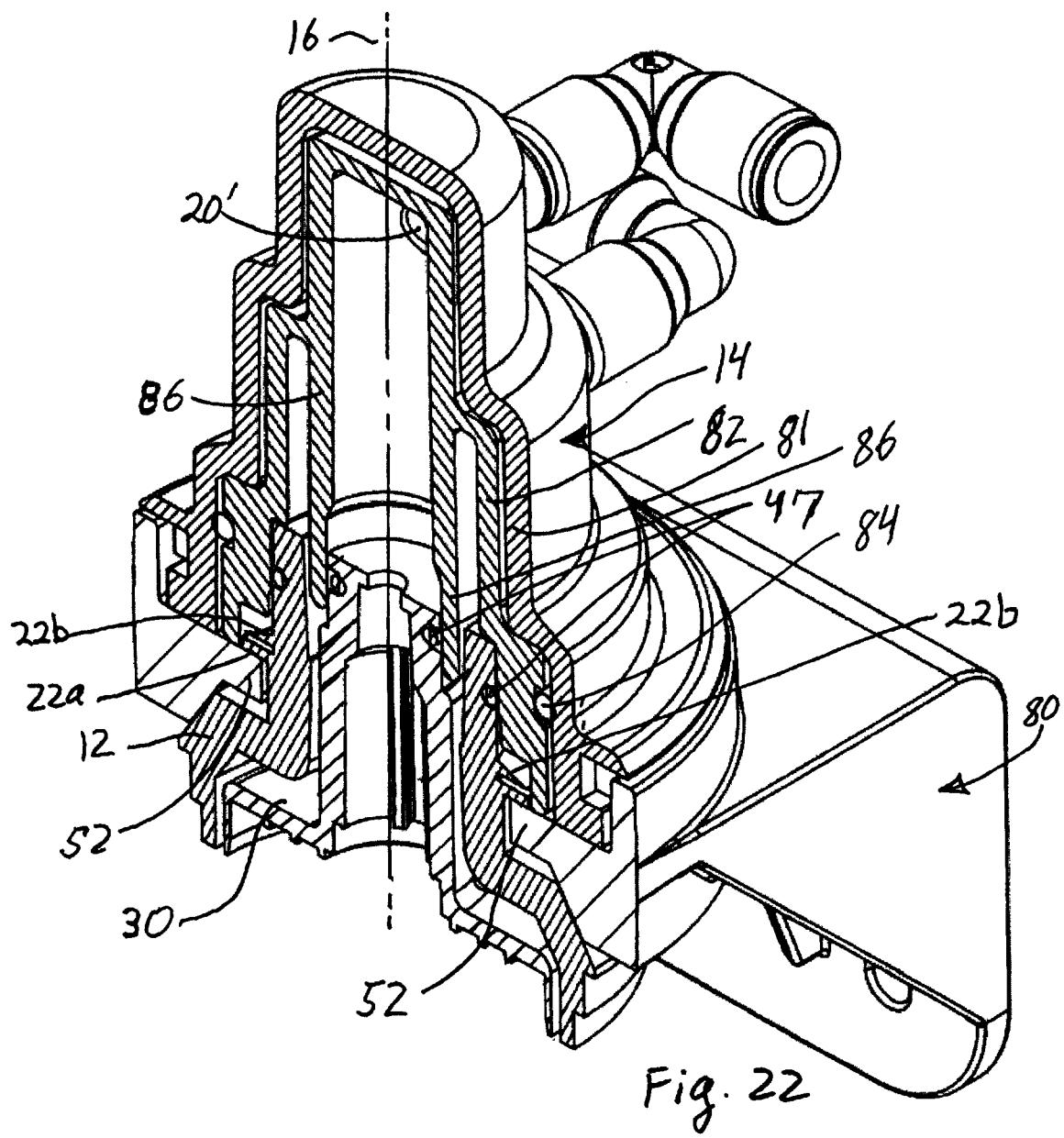
FIG. 22 is a sectional view of the filter cap of FIG. 19 inserted into a manifold.
Figure 23:
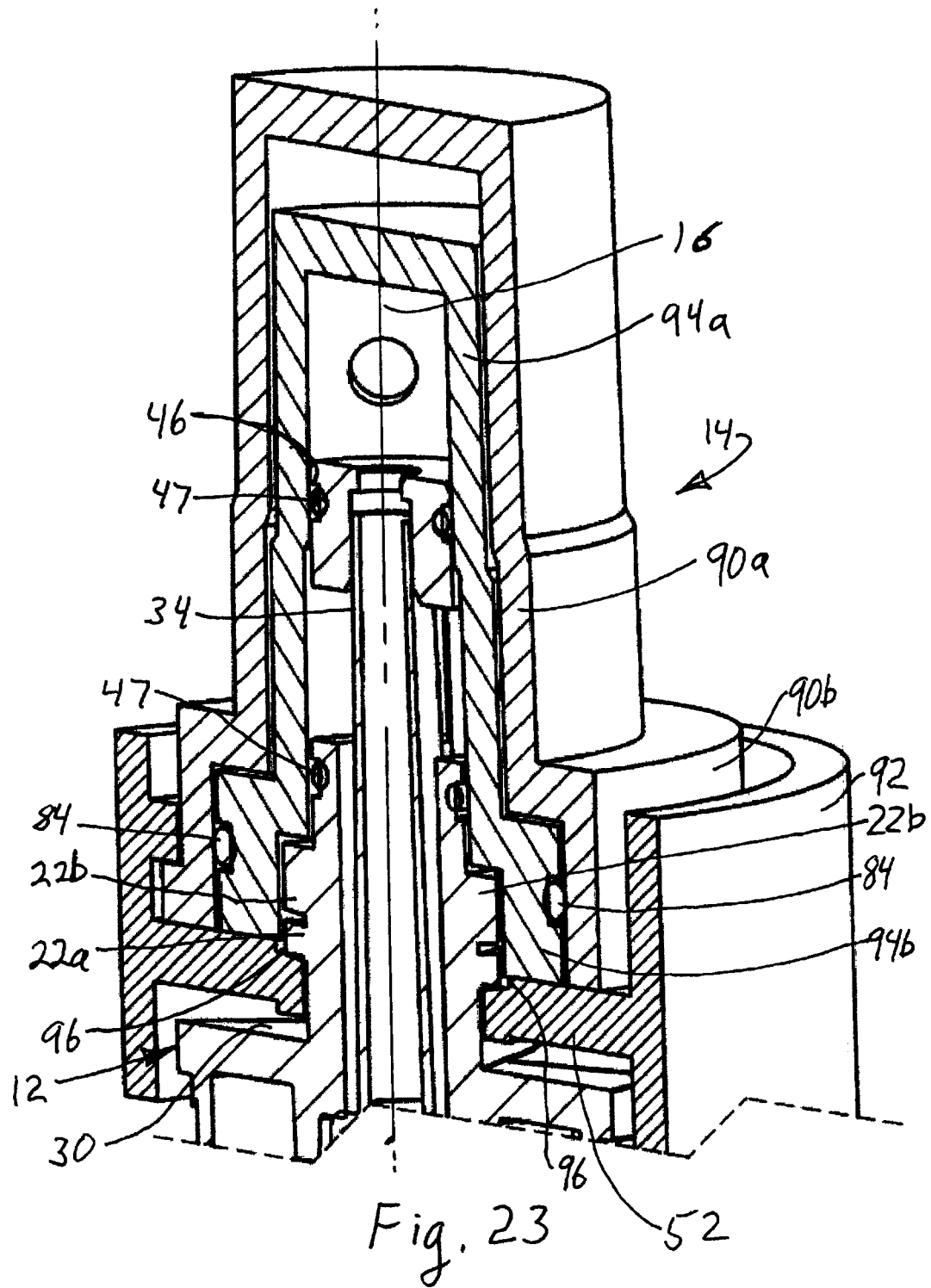
FIG. 23 is a sectional view of the filter cap of FIG. 5 in a manifold.

The distance separating the lug portions 22a, 22b is selected to allow visual confirmation that the first portion 22a has permanently deformed, and it is also preferably selected so that the ring seals 47 between the neck 23 and the manifold 14 do not leak. Referring to FIGS. 22-23, the ring seals 47 permit about 0.01 to about 0.04 inches of axial movement before leakage is believed to start under normal line pressure, and preferably permit about 0.03 inches of such motion and more preferably permit about 0.030 inches of motion. The motion will vary with the particular cartridge and manifold design. The permitted axial movement before one of the seals disengages from the mating surface sufficient to allow leakage will vary. The permitted axial motion is discussed above, with the preferred movement of about 0.03 inches (about 2.3 mm) being preferred for water filter cartridges for household appliances.

As the circumferential length of the lug portions 22a, 22b vary the resistance to axial deformation increases. As the thickness in the axial direction increases, the lug portions 22a, 22b increase in resistance to axial deformation. As the thickness in the axial direction decreases, the lug portions 22a, 22b decrease in resistance to axial deformation. The greater the axial distance between the lug portions 22a, 22b, the more deformation needed before the first portion 22a abuts the second portion 22b and the resistance to axial movement increases. Thus, the resistance to permanent axial deformation will vary in ways that may be determined using strength of materials information and deformation information suitable for the particular configurations and material used.

The second lug portions 22b are configured so that the axial movement of the filter cartridge 10 stops when the first portion 22a abuts against the second portion 22b, preferably along a substantial portion (over half) of the length of the first and second portions 22a, 22b, and preferably over the entire length of the first portion 22a. Advantageously, the first portion 22a is configured so that it permanently deforms uniformly along the circumferential length of the first portion and in the axial direction. When the first portion 22a moves along the axis 16 and abuts against the second portion 22b the resistance to axial motion is then provided by both the lug portions 22a, 22b so the resistance increases.

The deformed first portion 22a and the second portion 22b combine to provide the resistance needed to meet the qualification testing pressure. Typically, a random quantity of filter cartridges 10 are selected and pressurized to a much higher pressure to qualify the design and provide assurance it will readily survive the rated pressure. A qualification test pressure of about 300 psi to about 500 psi for residential or commercial water filter cartridges is believed suitable, with discrete test pressures of about 350 psi, 400 psi and 450 psi also believed suitable for configuring the first lug portion 22a, and with lower test pressures of about 200 psi and about 250 psi also believed suitable, as well as higher pressures of about 550 psi, about 600 psi, about 650 psi and about 750 psi.

For the configuration of FIGS. 1-4, the first portion 22a made of polypropylene and having an axial thickness of about 0.09 inches (about 2.3 mm) and a circumferential length of about 0.5 inches is believed suitable for a ratted pressure of 60 psi. The second portion 22b of polypropylene and having an axial thickness of about 0.1 inches or more and a circumferential length of about 0.5 is believed suitable for a qualification pressure of about 300 psi. The portions 22a, 22b may extend about 0.2 to about 0.2 inches radially. The circumferential length of the portions 22a, 22b is preferably the same in this embodiment and in the other embodiments.

The first and second lug portions 22a, 22b allow the filter cartridge 10 to undergo and pass a high pressure qualification of the cartridge. The deformation of the first portion 22a allows permanent deformation to occur if the actual water pressure in the filter cartridge 10 exceeds the rated pressure, given as 60 psi in the example. The axial distance separating the first and second lug portions 22a, 22b allows visual confirmation of permanent deformation and excessive line pressure, while also preventing the cartridge 10 from moving axially far enough to leak. In the event the cartridge does leak, the permanent deformation of first lug portion 22a confirms that the line pressure exceeded the rated pressure for the cartridge sufficiently to permanently deform the first portion 22a. The permanently deformed first portion 22a thus provided objective evidence that the filter cartridge met its pressure rating. Thus, in use, if the rated pressure is exceeded the deformable portion 22a permanently deforms against the second, stop portion 22b which advantageously prevents leakage but shows the rated pressure is exceeded. If a leak occurs, the permanent deformation of the first portion 22a shows that the rated pressure of the cartridge 10 was exceeded.

Not previously described are recesses 60 in the base of the filter cap 12. The recesses 60 extend circumferentially around a periphery of the base of the filter cap 12 and mate with and receive corresponding projections on the manifold to limit rotation of the filter cap 12 relative to the manifold. The configuration and location of the recess 60 vary, and may be omitted, depending on the design of the filter cartridge 10 and the manifold 14.

Referring to FIGS. 5-8, a further embodiment is shown for the lugs 20. The filter cap 12 has two lugs 20 on diametrically opposing sides of the filter cap 12. The filter cap 12 has a base with a circumferentially inclined slope forming a ledge at the end of the inclined recesses 60 that is configured to receive mating portions of the manifold 14 during use, with the ledge abutting part of the manifold to limit rotation. The filter cap 12 has grooves or glands 46 to receive the ring seals 47 such as O-rings and openings to provide flow paths for water to pass from the manifold 14 to the filter cartridge 10 during use.

The first portion 22a of the lugs 20 is as generally described earlier but the first portion 22a is inclined relative to the axis 16 and has a uniform axial thickness with leading and trailing ends 24a, 24b parallel to the axis 16. The incline of the lower, first portion 22a helps engage the flange 52 in the manifold 14.

The second lug portion 22a has a leading end 26a extending axially and a trailing end 26b extending axially and parallel to the leading end 26a. A horizontal member 62 in the plane orthogonal to axis 16 joins the axially extending ends 26a, 26b. The ends 26a, 26b may be viewed as depending from the upper lug portion or second portion 22b, or the portion 62 may be viewed as extending between adjacent sides of the vertical ends 26a, 26b. The leading end 26a is shorter in axial length than the trailing end 26b. The distance between the upper side of the first portion 22a and the lower side of ends 26a, 26b is the same, and is advantageously about 0.03 inches (about (about 7-8 mm). The first and second portions 22a, 22b are separated an axial distance d, preferably by a straight channel forming a gap of about 0.03 inches at the closest parts, here the ends 26a, 26b and the corresponding adjacent ends 24a, 24b.

While the figures show two vertical ends 26a, 26b, additional vertical portions could be used between the ends 26a, 26b. If the ends 26a, 26b are thin then more vertical segments depending from the horizontal member 62 may be provided to increase the axial resistance to motion as desired. The configuration of the first portion 22a of this embodiment is as described above. The axially depending ends 26a, 26b stop axial movement of the first portion 22a, but at two separated locations (ends) of the first portion 22a. Other than the configuration, the design considerations for the first and second portions 22a, 22b are as described regarding FIGS. 1-4.

Thus, in use, if the rated pressure is exceeded the deformable portion 22a permanently deforms against the second portion 22b which advantageously prevents leakage but shows the rated pressure is exceeded. If a leak occurs, the permanent deformation of the first portion 22a shows that the rated pressure of the cartridge 10 was exceeded.

Alternatively described, the stop portion 22b is located above the first portion 22a and extends around a circumference of the filter cap 12 corresponding to the circumference of the first portion 22a. Two or more stop portions depend from or extend from the bottom of the horizontal member 62, with two of the stop portions preferably located at the leading and trailing ends 26a, 26b of the second portion 22b. If more than two stop portions are used them may be located between the depending end stop portions 26a, 26b.

In use, the first portion 22a permanently deforms against the second portion 22b which advantageously prevents further movement of portion 22a and prevents movement of the ring seals 47 as would cause leakage but which permanent deformation shows the rated pressure is exceeded. If a leak occurs, the permanent deformation of the first portion 22a shows that the rated pressure of the cartridge was exceeded.

Advantageously, the first portion 22a has a circumferential length of about 0.5 inches, an axial length of about 0.5 to about 0.8 inches, and is made of polypropylene. The lug portions 22a, 22b are advantageously injection molded with the filter cap 12, although the gap separating the closest parts of the first and second portions 22a, 22b could be cut or formed after the lugs 20 are formed—as discussed herein.

Referring to FIGS. 9-12, a still further embodiment is shown for the lugs 20. The filter cap 12 has two lugs 20 on diametrically opposing sides of the filter cap 12. The filter cap 12 has a base with an alignment projection 62 instead of a recess 60 (FIG. 5) with the horizontal member 62 abutting a stop in the manifold 14 to position the filter cap 12 relative to the manifold 14 during use.

The mounting lug 20 has the first portion 22a having a curved lower side forming a portion of a semi-circle. The second portion 22b has a rectangular shape with curved ends continuing the semi-circular shape of the first portion 22b. The upper corners of the second portion 22b may be rounded. The first and second portions 22a, 22b are separated an axial distance d, preferably by a straight channel forming a gap of about 0.03 inches. In use, the curved ends of the first and second portions 22a, 22b allow the lower first portion 22a to ramp onto the mating flange 52 in the manifold 14 during use. The curved end on second portion 22b helps guide the lug 20 onto the mating flange 52.

In use, if the rated pressure is exceeded the deformable portion 22a permanently deforms against the stop portion 22b which advantageously prevents leakage but shows the rated pressure is exceeded. If a leak occurs, the permanent deformation of the first portion 22a shows that the rated pressure of the cartridge 10 was exceeded.

For a rated pressure of 60 psi, when made of polyethylene the mounting lugs 20 advantageously have the first portion 22a with a circumferential length of about 0.65 inches and preferably 0.650 inches, and extend radially outward about 0.1 inches and preferably about 0.106 inches. The preferred first portion 22a has an axial thickness of about 0.09 inches and preferably 0.090 inches, with the gap or distance d being 0.03 inches and preferably 0.030 inches. The deforming pressure is the axial pressure in the filter cartridge reacted 10 by the mounting lugs 20 and the flange 52. The second portion 22b is advantageously configured to have a stiffness and shear deformation in the axial direction of about half that of the first portion 22a and preferably the same as that of the first portion 22a and more preferably at least twice that of the first portion 22a.

Figures 9, 12:
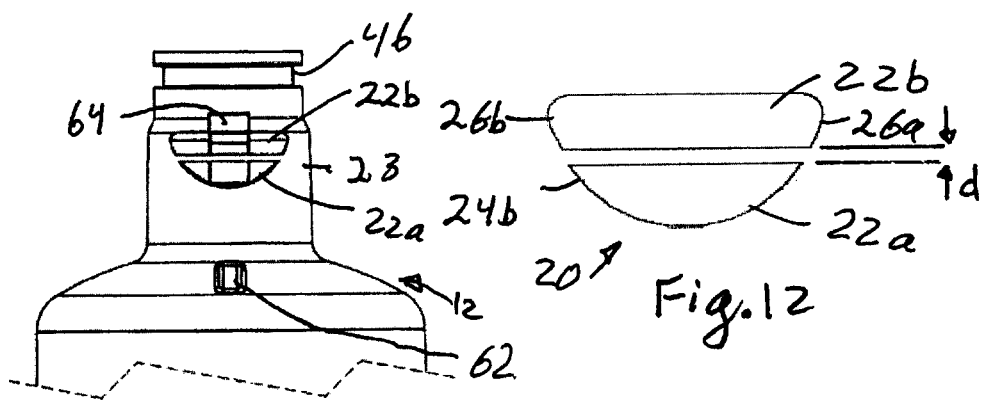
FIG. 9 is a front plan view of a still further embodiment of a filter cap with mounting lugs, with the back plan view being a mirror image thereof.
FIG. 12 is a plan view of the mounting lugs of FIG. 9.
Figures 10, 11:
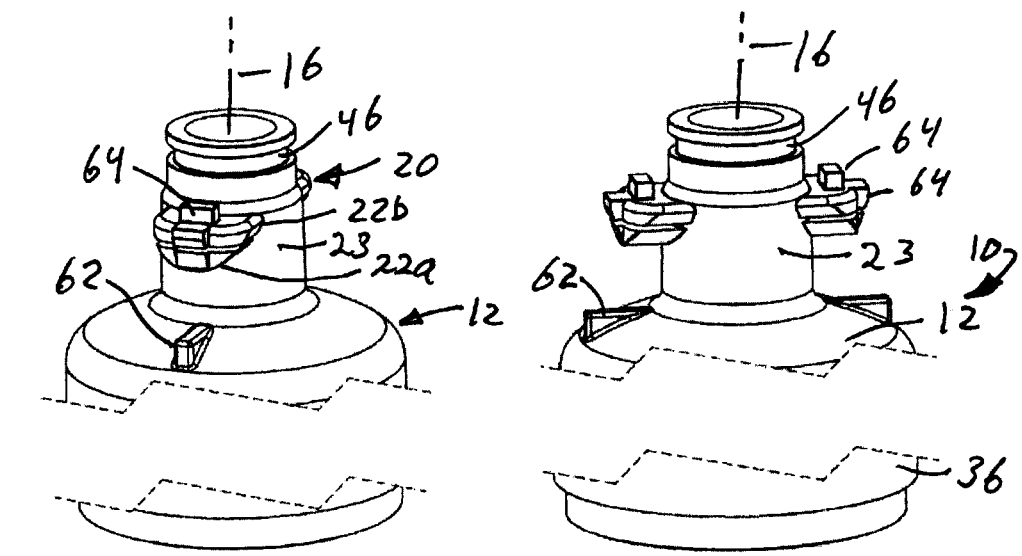
FIG. 10 is an upper perspective view of the filter cap and mounting lugs of FIG. 9.
FIG. 11 is an upper perspective view of the filter cap and mounting lugs of FIG. 9 rotated about 90 degrees from the view of FIG. 9.

As better seen in FIGS. 9-11, the first and second portions 22a, 22b may have an alignment projections 64 on them. While the alignment projections 64 may increase the size of the parts to which they are affixed, they do not alter the permanent deformation of the deformable portion 22a unless the projection 64 extends to the juncture of the first portion 22a with the filter cap 12.

This still further embodiment is configured to function as described herein. In use, if the rated pressure is exceeded the first, deformable first portion 22a permanently deforms against the second portion 22b which advantageously prevents leakage but shows the rated pressure is exceeded.

Figure 13:
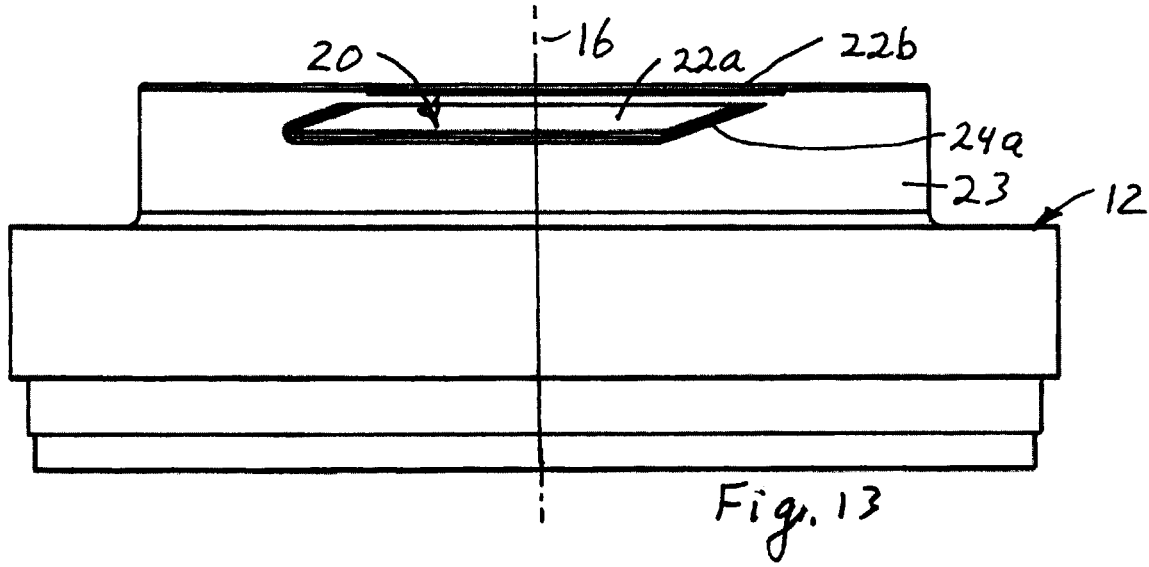
FIG. 13 is a plan front view of yet another embodiment of a filter cap with mounting lugs having a thin profile on the lugs, with the opposing back view being a mirror image thereof.
Figure 14:
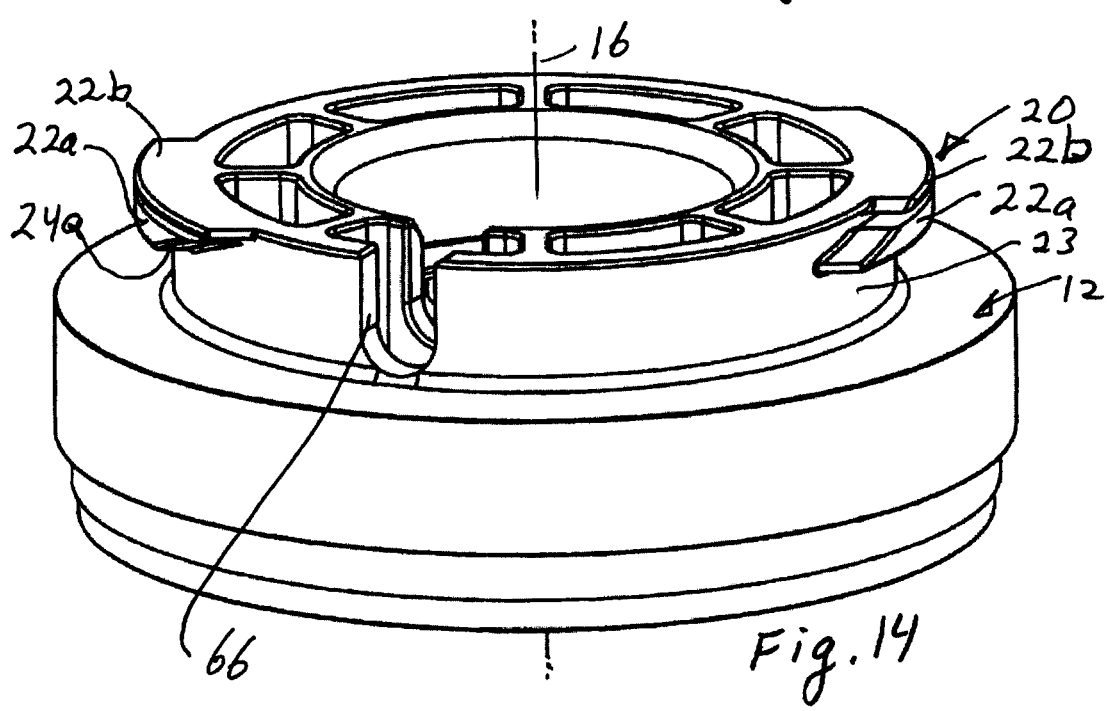
FIG. 14 is an upper perspective view of the filter cap of FIG. 13 showing a leak indicator slot.
Figure 15:
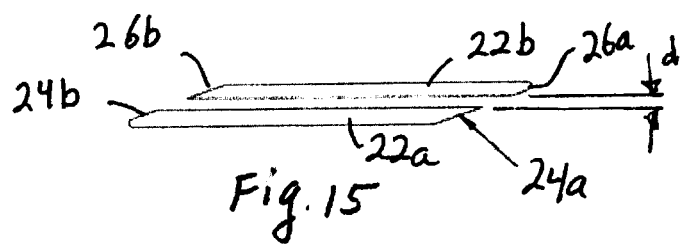
FIG. 15 is a plan view of the mounting lugs of FIG. 13.

Referring to FIGS. 13-15, in some instances there is not a lot of axial distance to accommodate the lugs 20 and thus, the stop portion 20b may be thinner axially than the first permanently deformable portion 20a, yet the stop portion 20b still resists further movement of the deformable portion 22a. Further, in these embodiments the lugs 20 are shown on a filter cap 12 having a leak indicator slot 66, as generally disclosed in U.S. Pat. No. 8,216,463, the complete contents of which are incorporated herein by reference.

The first portion 22a extends in a plane orthogonal to the axis 16. The first and second portions 22a, 22b are separated an axial distance d, preferably by a straight channel forming a gap of about 0.03 inches at the closest parts, here the top of the first portion 22a and the bottom of the second portion 22b. The distance between the top surface of the second portion 22b and the bottom surface of the first portion 22a is about 5/16 inch, or about 0.313 inches (about 9 mm) when the parts are made of polyethylene.

In use, the curved end 24a of the first portion 22a allows the first portion 22a to ramp onto the mating flange 52 in manifold 14 during use. The curved end on second portion 22b helps guide the lug 20 onto the mating flange 52 to position the cartridge 10 in the manifold 14 for use. If the rated pressure of the cartridge 10 is exceeded the first, deformable portion 22a permanently deforms against the second portion 22b which advantageously prevents leakage but shows the rated pressure is exceeded. If a leak occurs, the permanent deformation of the first portion 22a shows that the rated pressure of the cartridge was exceeded. In the depicted embodiment the stop portion 22b has a smaller axial thickness than the permanently deformable portion 22a and the result is that if the pressure on the filter cartridge 10 is greatly exceeded, then the deformable first portion 22a may permanently deform and it is possible that the stop portion 22b may be insufficient to maintain the positon of the cartridge 10 in the manifold 14 to prevent leakage.

Referring to FIGS. 16-18, an embodiment is shown using a variation of keyed mounting lugs as generally disclosed in U.S. Pat. No. 7,763,170, the complete contents of which are incorporated herein by reference. The first portion 22a extends radially away from the axis 16 and neck 32 as do the three segments 68a, 68b, 68c cooperating to collectively form the second portion 22b. The second portion 22b is segmented into three, equally spaced segments 68a, 68b, 68c that extend over the same arc and same circumferential distance as first portion 22a. The first portion 22a is depicted as in a horizontal plane, orthogonal to the axis 16 with the first and second portions 22a, 22b (68a, 68b, 68c) separated an axial distance d, preferably by a straight channel forming a gap of about 0.03 inches at the closest parts, here the top of the first portion 22a and the bottom of the three segments 68a, 68b, 68c forming the second portion 22b. But the first portion 22a could be a curved member with the bottoms of segments 68a, 68b, 68c located so they are an equal distance from the closest part of the deformable portion 22a. In the depicted embodiment the segments 68a, 68b, 68c are trapezoidal in shape and extend radially outward from the outer neck 23.

The segments 68a, 68b, 68c are each generally trapezoidal in shape, each with axially aligned leading edges 26a and inclined trailing edges 26b. But leading segment 68a is larger than intermediate or middle segment 68b which is larger than trailing segment 68c, with the largest portion 68a preferably forming the leading end 26a of the second portion 22b.

For a rated pressure of 60 psi, when made of polyethylene the mounting lugs 20 advantageously have a first portion 22a with a circumferential length of about 0.65 inches and preferably 0.650 inches, and extend radially outward about 0.1 inches and preferably about 0.106 inches. The preferred first portion 22*a* has an axial thickness of about 0.09 inches and preferably 0.090 inches, with the gap or distance d being 0.03 inches and preferably 0.030 inches. This configuration is believed to not begin to yield until an axial pressure of 370 psi is applied to the filter cartridge 10. The deforming pressure is the axial pressure in the filter cartridge reacted by the mounting lugs 22 (segments 68*a*, 68*b*, 68*c* and lug 22*a*) and flange 52.

For a rated pressure of 60 psi, when made of polyethylene the mounting lugs 20 advantageously have the first portion 22*a* with a circumferential length of about 0.78 inches and extend radially outward about 0.08 inches and preferably about 0.078 inches. The preferred first portion 22*a* has an axial thickness of about 0.27 inches and preferably 0.266 inches, with the gap or distance d being about 0.03 inches and preferably 0.030 inches. The second portion 22*b* and its segments 68*a*, 68*b*, 68*c* are as follows. The largest segment 68*a* has a circumferential width of about 0.19 inches and preferably about 0.193 inches, with the inclined face at an angle of about 36° relative to the axis 16. The first segment 68*a* preferably extends radially outward the same distance as the first portion 22*a*, a distance of about 0.08 inches and preferably about 0.078 inches. The second (middle) segment 68*b* has an axial thickness of about 0.09 inches (preferably 0.090 inches), a circumferential width of about 0.16 inches, extends radially outward a distance of about 0.08 inches (preferably 0.078 inches) and has its depicted inclined end inclined at an angle of about 36° relative to axis 16. The smallest segment 68*c* has an axial thickness of about 0.06 inches (preferably 0.62 inches), a circumferential width of about 0.09 inches (preferably 0.090 inches), extends radially outward a distance of about 0.08 inches (preferably about 0.078 inches) and has its depicted inclined end inclined at an angle of about 36° relative to axis 16. The end 24*a*, and trailing end 26*b* and the inclined surfaces 26*c*, 26*d* on the segments 68*a*, 68*b*, 68*c*, respectively, are all preferably inclined at the same angle, about 36°, relative to axis 16 in this embodiment. This configuration is believed to have a 0.030 inch deformation at an axial pressure of 282 psi applied to the filter cartridge 10 when there are two lugs 20 and their portions 22*a*, 22*b* are made of polyethylene. The deforming pressure is the axial pressure in the filter cartridge 10 reacted by the mounting lugs 22 (segments 68*a*, 68*b*, 68*c* and first portion 22*a*) and flange 52.

In use, the inclined end 24*a* of the first portion 22*a* allows the lower first portion 22*a* to ramp onto the mating flange 52 in the manifold 14 during use. The segments 68*a*-68*c* forming the second portion 22*b* act as keys to fit within mating portions (not shown) of the manifold 14 position the cartridge 10 and the filter cap 12 in the manifold 14 for use. If the rated pressure of the cartridge 10 is exceeded the deformable first portion 22*a* permanently deforms against the second portion 22*b* (68*a*, 68*b*, 68*c*) stop further deformation and which advantageously prevent sufficient motion of the filter cartridge 10 to prevent leakage. If a leak occurs, the permanent deformation of the first portion 22*a* shows that the rated pressure of the cartridge 10 was exceeded.

The shape of the specific segments 68*a*, 68*b*, 68*c* are shown as trapezoidal with the trailing ends 26*b* being generally parallel but the shape may vary and be other than a trapezoid, and may be take the form of axial segments with rectangular shapes (as in FIGS. 5-8). Likewise, the number and spacing of the segments 68*a*, 68*b*, 68*c* may vary in order to act as "keys" to mate with corresponding located locks or recesses in the manifold 14 as described in U.S. Pat. Nos. 7,135,113 and 6,458,260.

The permanent deformation may extend along the entire length of the first portion 22*a* or may be initially localized and spread along a greater length as the pressure increases. The amount of deformation will also vary with the amount by which the actually applied pressure exceeds the rated pressure, and with the particular design of the portions 22*a*, 22*b*. For example, in the embodiment of FIGS. 16-18 which has a deformable first portion 22*a* with a (preferably) tapered leading end 24*a* and uniform axial thickness along its circumferential width, the permanent deformation typically begins at the leading end 24*a*, in part because the mating of the manifold flanges and deformable portion 22*a* makes the leading end a primary contact point with slightly larger forces than at the trailing end 24*b*. As operating pressure is applied to the filter 10 the force on the mounting lugs 20 and deformable first portions 22*a* increases. When the applied pressure exceeds exerts a force on the deformable portions 22*a* that exceeds the yield strength of those deformable portions then they permanently deform, typically at the leading end 24*a*. As more pressure is applied and the rated pressure is further exceeded the permanent deformation extends further toward the trailing end 24*b*. For small excess pressures and smaller permanent deformations, the deformable portion 22*a* may or may not abut the second portion 22*b*, but measuring the gap between the first and second portions 22*a*, 22*b* or measuring the deformation of the first portion 22*a* may show the permanent deformation and confirm excess pressure was applied. For larger excess pressures and deformations the leading end 24*a* of the deformable portion 22*a* will abut the stop portion 22*b* and may remain in contact after the excess pressure is released. The larger the excess pressure the more the deformation extends along the length of the deformable portion 22*a*. For large excess pressures the permanent deformation may extend along the entire length and if the excess pressure is increased enough even the stop portions 22*b* may deform and ultimately shear off. But whether the permanent deformation begins at one end and progresses along the length of the deformable portion 22*a* depends on the design of the mating parts as that affects how the lugs 20 react the pressure pushing the filter cartridge 10 out of the manifold 14.

Preferably, the permanent deformation extends along less than a substantial part of (50% or less) of the circumferential length of the deformable portion 22*a*, and less preferably the permanent deformation extends more a than substantial part (over 50%) of the circumferential length of the deformable portion 22*a*. Advantageously the gap between the first and second portions 22*a*, 22*b* is constant and measured before shipment of the filters 10 in order to provide an visual reference for determining permanent deformation.

By way of specific examples, for the deformable portion 22*a* in FIGS. 16-18, each of two deformable portions 22*a* may have an axial thickness of about 0.07 inches (preferably 0.069 inches), a circumferential length of about 0.76 inches (preferably 0.758 inches end-to-tip), and extend radially outward from the neck a distance of about 0.08 inches (preferably 0.078 inches) when made of polypropylene, with the gap between portions 22*a*, 22*b* being 0.030 inches. That is, the top surface of radially and horizontally extending deformable portion 22*a* is 0.030 inches from the bottom surfaces of stop portions 22*b*. An applied pressure of 382 psi (191 psi on each of two lugs 20 and deformable portions 22*a*) results in a permanent deformation of 0.030 inches.

Figure 19:
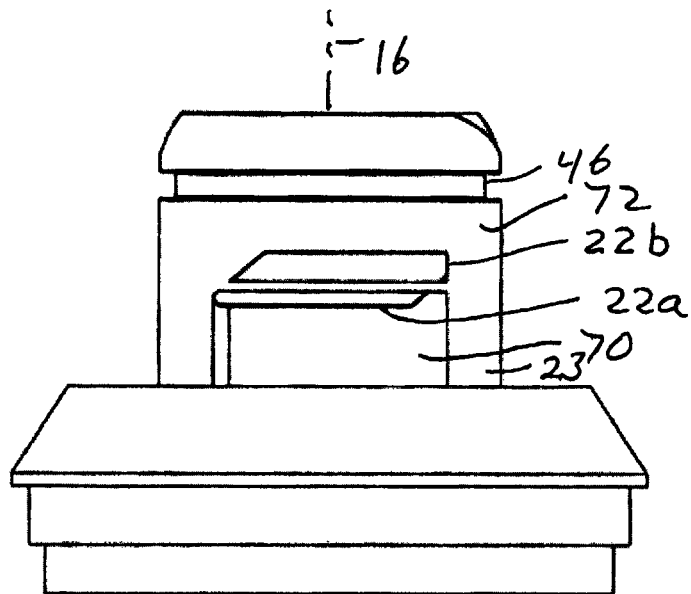
FIG. 19 is a front plan view of a further embodiment with a radially offset first mounting portion, with the opposing back view being a mirror image thereof.
Figure 21:
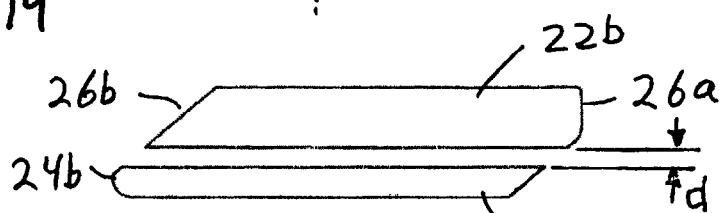
FIG. 21 is a plan view of the mounting lugs of FIG. 19.
Figure 20:
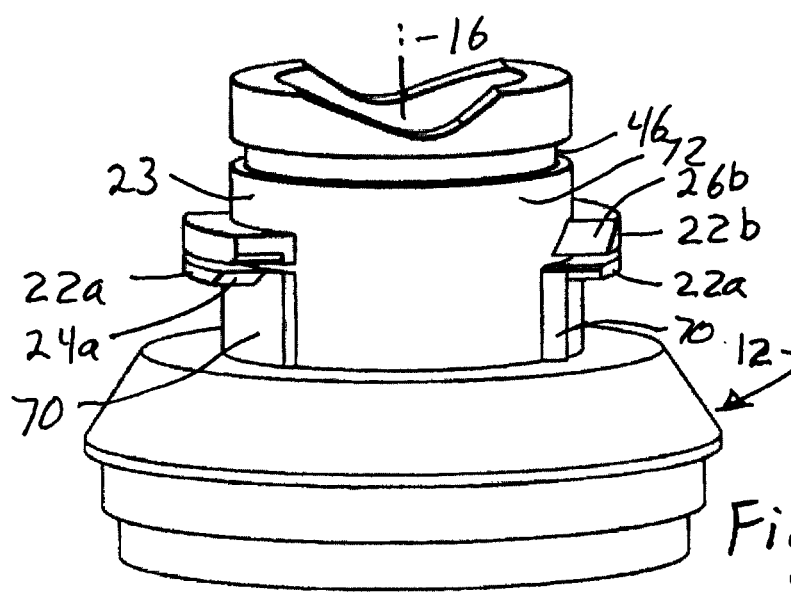
FIG. 20 is an upper perspective view of the mounting lug embodiment of FIG. 19 rotated about 90 degrees.

Referring to FIGS. 19-21, another embodiment is shown with the lower, first deformable portion 22*a* being radially offset from the 16 axis relative to the second portion 22*b* in that the ends of the portions 22*a*, 22*b* are not radially aligned with the first portion 22a extending over a circumferential arc that is rotationally shifted or rotated relative to the circumferential arc of the second portion 22b. As best seen in FIG. 21, the first deformable portion 22a is shifted to the left while the second stop portion 22b is shifted to the right. The ends of the first and second portions 22a, 22b are thus not in the same radial plane through axis 16, but are radially offset. Advantageously, the leading edge of the second portion 22b is offset to the right as shown in the orientation of FIG. 21, which corresponds to a counter-clockwise direction when viewed along axis 16 extending through the filter cartridge neck. The leading edge is the edge of the portion 22a, 22b located in the direction of rotation for connecting the filter 10 to the manifold 14, and the trailing end is the opposite end which is located in the direction of rotation for removing the filter cartridge 10 from the manifold 14. Advantageously, the trailing edge of the first portion 22a is offset to the left as shown in the orientation of FIG. 21, which corresponds to a clockwise direction when viewed along axis 16 extending through the filter cartridge neck. Advantageously the stop portion 22b has a leading edge that is located circumferentially ahead of a leading end of the deformable portion 22a in the direction of rotation during installation, and that is also ahead of the trailing end of the deformable portion 22a. The deformable portion 22a has a trailing end that is located circumferentially behind the trailing edge of the stop portion 22b.

In the depicted embodiment the first and second portions 22a, 22b each extend from the filter cap 12 except in this configuration the portions 22a, 22b do not extend from the same surface. Instead, the first portion 22a extends outward from a boss 70 on a neck 72 of the filter cap 12 while the second portion 22b extends from the neck 72. The boss 70 places the juncture of the first, deformable portion 22a and the boss 70 further outward from the axis 16 than the juncture of the second, stop portion 22b with the neck 72. The boss 70 positions the base of the first portion 22a radially outward from the base of the second portion 22b. The boss 70 positions the base of the first portion 22a radially outward about 0.02 to about 0.05 inches or less. The radial offset helps the filter cap 12 fit into the manifold 14. The boss 70 results in the deformable portion connecting to the filter cap at a radial distance that is greater than where the stop portion connects to the filter cap.

Referring to FIG. 22, the manifold 14 may comprise a mounting bracket 80 which has the manifold flange 52 formed thereon to engage the locking, bayonet lugs 20 with the bottom of the first deformable portion 22a abutting the top of the flange 52. The flange 52 forms part of a cylindrical recess or socket in the bracket 80 within which the manifold 14 sits. The depicted manifold 14 has a housing 81 that surrounds a barrel valve 82 with a ring seal 84 between the outside of barrel valve 82 and the inside of a manifold housing 81. The barrel valve 82 has a cylindrical tube 86 that extends downward along axis 16, with the neck 32 of the filter cap 12 fitting inside the tube 86 to form a fluid path in fluid communication with an opening 20' of the barrel valve 82 which is in fluid communication with and preferably aligned with the opening 20' of the barrel valve housing 81 and manifold 14. The outside of the cylindrical tube 86 forms a fluid path in fluid with the outside of the filter media (FIG. 4).

The second portion 22b is advantageously configured to have a stiffness and shear deformation in the axial direction of about half that of the first portion 22a and preferably the same as that of the first portion 22a and more preferably at least twice that of the first portion 22b. For a rated pressure of 60 psi, when made of polyethylene the mounting lugs 20 advantageously have a first portion 22a with a circumferential length of about 0.65 inches and preferably 0.650 inches, and extend radially outward about 0.1 inches and preferably about 0.106 inches. The preferred first portion 22a has an axial thickness of about 0.09 inches and preferably 0.090 inches, with the gap or distance d being 0.03 inches and preferably 0.030 inches. The deforming pressure is the axial pressure in the filter cartridge 10 reacted by the mounting lugs 20 and flange 52.

In use, the inclined end 24a of the first portion 22a allows the lower portion 22a to ramp onto the mating flange 52 in the manifold 14 during use. The segments 68a-68c forming the second portion 22b act as keys to fit within mating portions (not shown) of the manifold 14 position the cartridge 10 and filter cap 12 in the manifold 14 for use. If the rated pressure of the cartridge is exceeded the first, deformable portion 22a permanently deforms against the second, stop portion 22b (68a, 68b, 68c) stop further deformation and which advantageously prevent sufficient motion of the filter cartridge to prevent leakage. If a leak occurs, the permanent deformation of the first portion 22a shows that the rated pressure of the cartridge was exceeded.

Referring to FIG. 23, the filter cap 12 of FIGS. 1-5 is inserted into the manifold 14 having a stepped configuration with an outer manifold housing 90 having a smaller, cylindrical diameter upper portion 90a and a lower, larger diameter, cylindrical portion 90b. The larger diameter portion 90b fits into a recess or socket in a manifold bracket 92 shown as a cylindrical tube with a mounting flange (not shown). The manifold bracket 92 has an inward extending flange forming the manifold flange 52 that form the bottom of the recess or socket within which the lower portion 90b of the manifold housing is located. The manifold flange is configured to engage the locking, bayonet lugs 20 with the bottom of the first deformable portion 22a abutting an annular recess 96 in the top of the flange 52. The flange 52 forms part of a cylindrical recess or socket in the bracket 80 within which the manifold 14 sits during use. The depicted manifold with upper and lower portions 90a, 90b forms a stepped, cylindrical housing that surrounds a stepped, barrel valve 94 having an upper, cylindrical portion 94a and a lower, larger diameter stepped portion 94b that fits inside manifold portion 90a, 90b. The ring seal 84 is located between the outside of barrel valve 82 and the inside of the manifold housing 81. The distal end of the filter cap 12 extends into the inside of the smaller diameter portion 94a of the barrel valve with seals 47 sealing on at two spaced-apart locations to define the two flow paths into and out of the filter cap 12 and the filter cartridge 10. A fluid path through the neck 32 of the filter cap 12 forms one fluid path and flow around the outside of the neck 32 but below the distal ring seal 46 forms the second fluid path to the barrel valve. The barrel valve 82 places these two fluid paths in fluid communication with corresponding flow paths in the manifold 14 as is known in the art and not described in detail herein.

Figure 25:
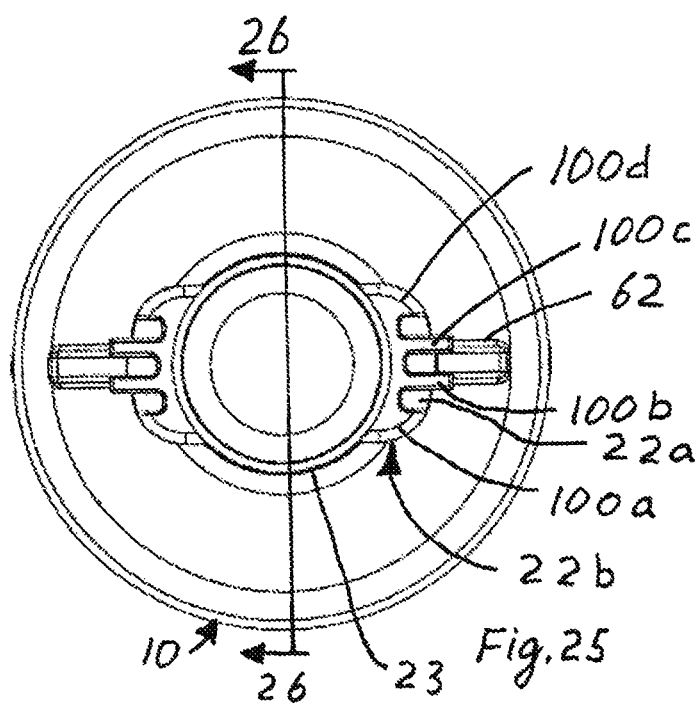
FIG. 25 is a top plan view of the filter cartridge housing of FIG. 9.
Figure 26:
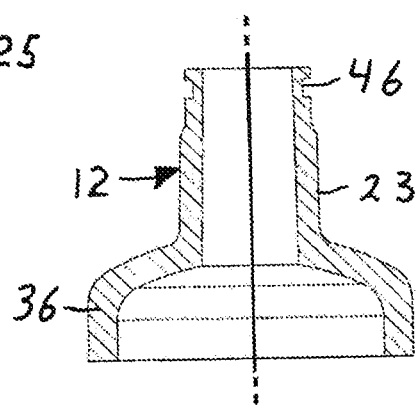
FIG. 26 is a sectional view of the filter cartridge housing of FIG. 9 taken along section 26-26 of FIG. 25.
Figure 24:
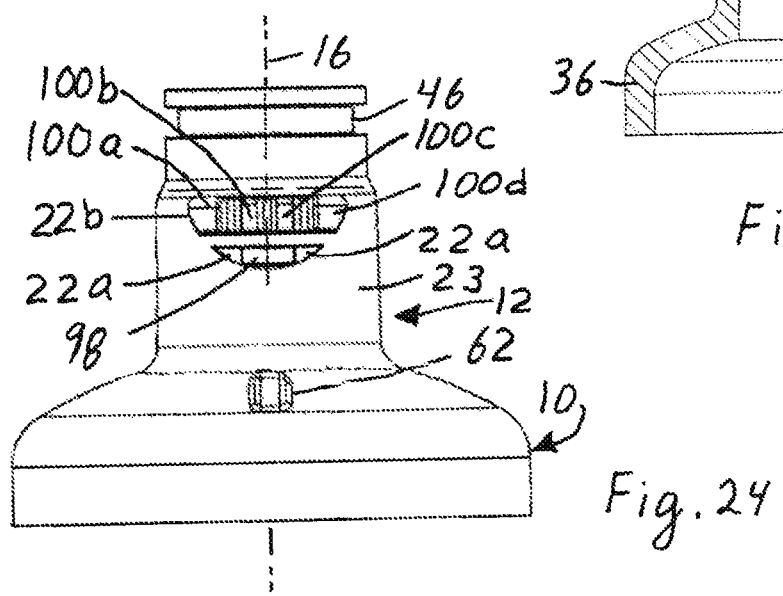
FIG. 24 is a front plan view of a filter cartridge housing FIG. 9 with a different lug arrangement, with the opposing back view being a mirror image thereof.

Referring to FIGS. 24-26, a still further embodiment is shown for the lugs 20 which are a variation of the lugs 20 of FIGS. 9-11. The filter cap 12 has two lugs 20 on diametrically opposing sides of the filter cap 12. The filter cap 12 has a base with an alignment projection 62 instead of a recess 60 (FIG. 5) with the projection 62 abutting a stop in the manifold to position the filter cap 12 relative to the manifold 14 during use. The filter cap 12 is integrally molded as part of the filter housing 36 in this configuration.

An interior portion of the filter cap 12 will extend from the inside of the filter body to form the remainder of the filter cap 12 during use.

The mounting lug 20 has a first portion 22a having a curved lower side forming a portion of a semi-circle and an upper portion that is flat in preferably in a plane orthogonal to the axis 16. The semicircular first portion 22a has a central protrusion 98 on its outward face shaped like a rectangle with the rectangular protrusion angled inward toward the axis 16 so the top portion of the protrusion 98 is further from the axis 16 than is the bottom portion. The rectangular shaped protrusion leaves a generally triangular shape on each end as seen in the front view of FIG. 24. The part of first portion 22a that permanently deforms is adjacent the juncture with the cylindrical neck of the filter cap 12.

Figure 27:
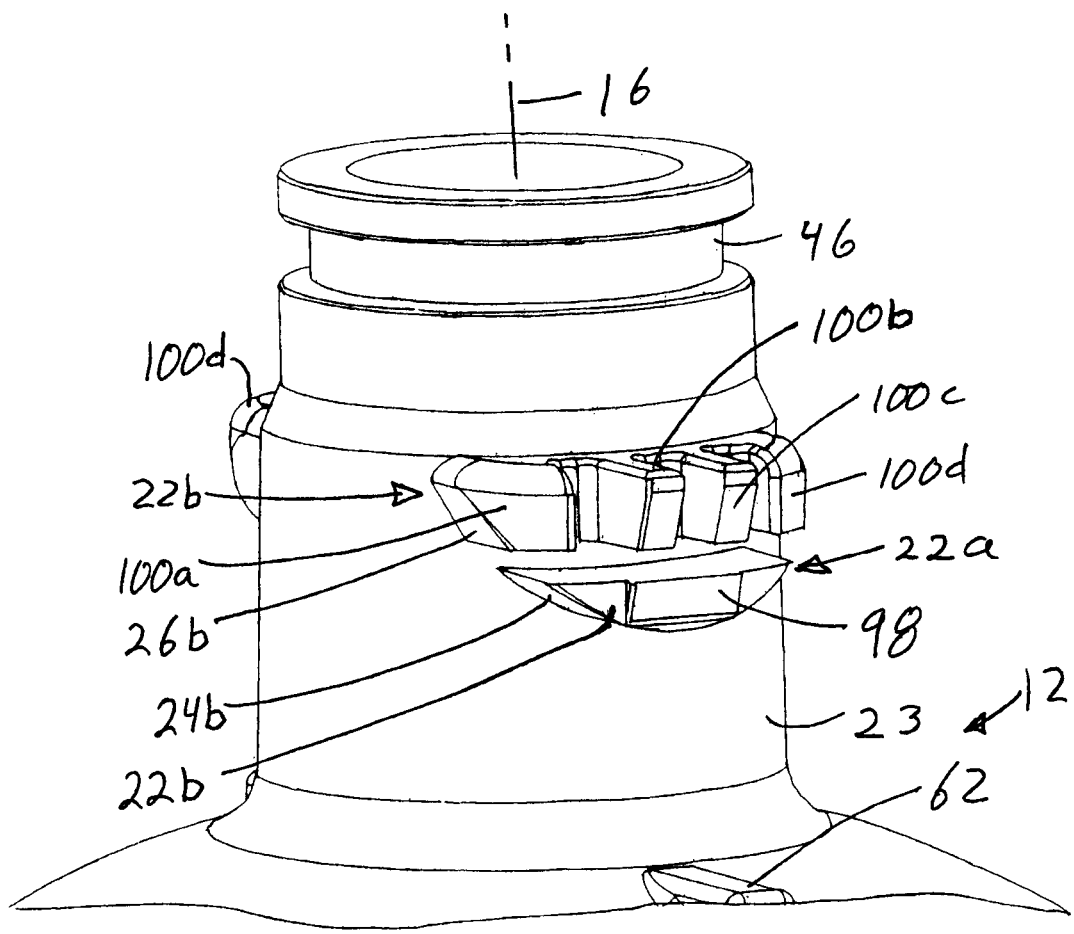
FIG. 27 is a perspective view of the filter cartridge housing of FIG. 24.

As best seen in FIG. 27, the second portion 22b has three axial slots separating the second portion 22b into four projections 100a, 100b, 100c, 100d, with the two end projections 100a, 100d having rounded outer edges and an inner straight, axial side, and the middle two projections 100b, 100c having two axial sides and extending further radially outward than the outer sides. The end two projections forming second portions 22b with the curved outer sides are axially aligned with and block the view of the outer ends of the first portion 22a when viewed from the top as in FIG. 25. As best seen in the top view of FIG. 25 and the perspective view of FIG. 27, the recesses or axial slots separating the middle projections 100b, 100c advantageously but optionally do not extend to the surface of the cylindrical neck 23 so there is a circumferential shear area at the neck 23 having a circumferential length (or width) of about 0.5 inches and about 0.1 inches axial length. The axial shear resistance of the second portion 22b is thus much larger than the projections 100a-100d.

As best seen in FIG. 27, the outward facing surface of the middle projections 100b, 100c may be inclined toward the axis 16 so the top portion of these two projections are further from the axis 16 than is the bottom portion. These inclined portions on upper portions 100b, 100c and on the lower projection 98 show that the outward facing surfaces of the portions 22a, 22b can have various shapes to actuate various mechanisms in the mating manifolds 14.

The first and second portions 22a, 22b are separated an axial distance d, preferably by a straight channel forming a gap of about 0.04 to 0.05 inches, and preferably about 0.04 to 0.045, and more preferably about 0.046 inches. The curvature of the bottom of the first portion 22a is about 0.5 inches and more preferably about 0.53 inches, with the leading and trailing ends 26a, 26b of the outer projections 100a, 100d having the same curvature and same center of curvature as the first portion 22a. The greatest axial length or thickness of the lower portion is about 0.08 inches and preferably about 0.075 inches. The projections 100b, 100c have a circumferential length or width of about 0.3 inches and an axial length or height of about 0.1 inches and preferably about 0.12 inches.

In use, if the rated pressure is exceeded the first, deformable portion 22a permanently deforms against the second, stop portion 22b which advantageously prevents leakage but shows the rated pressure is exceeded. If a leak occurs, the permanent deformation of the first portion 22a shows that the rated pressure of the cartridge was exceeded.

The permanent deforming pressure is the axial pressure in the filter cartridge reacted by the mounting lugs 22 and the flange 52 and for the above described embodiment of FIGS. 24-27, is believed to occur at about 370 psi or 400 psi when made of polyethylene The rated pressure for this cartridge would normally be 100 psi or 120 psi, which represents the maximum operating pressure, and the qualification pressure is typically three times the rated pressure or 300 psi and 360 psi, respectively. These pressures are for a normal system line pressure of 60-80 psi. In this example the specific dimensions given do not permanently deform between the rated and qualification pressures.

As better seen in FIGS. 9-11, the lug portions 22a, 22b may have alignment projections 64 on them. While the alignment projections 64 may increase the size of the parts to which they are affixed, they do not alter the permanent deformation of the first, deformable portion 22a unless the projection extends to the juncture of the portion 22a with the filter cap 12.

This still further embodiment is configured to function as described herein. In use, if the rated pressure is exceeded the first, deformable portion 22a permanently deforms against the second, stop portion 22b which advantageously prevents leakage but shows the rated pressure is exceeded.

The depicted filter 10 and filter cartridge cap 12 are aligned along longitudinal axis 16, but need not be so aligned as cartridges exist with the connecting filter cartridge cap 12 at right angles to the axis of the body of the filter cartridge. The portions 22a, 22b are equally applicable to this cartridge configuration with deformation occurring along that portion of the longitudinal axis 16 extending through the filter cartridge cap 12, which is at right angles to the axis of the filter housing 36.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Further, the various features of this invention can be used alone, or in varying combinations with each other and are not intended to be limited to the specific combination described herein. Thus, the invention is not to be limited by the illustrated embodiments.

What is claimed is:

1. A water filter cartridge for an appliance having a manifold into which the water filter cartridge is inserted during use, the manifold having a plurality of flanges for holding the water filter cartridge in the manifold during use, the water filter cartridge being designed for a nominal line pressure of X psi, the water filter cartridge comprising:
    a filter housing enclosing a filter media; and
    a filter cap including:
        a distal end;
        an inlet and an outlet both cooperating with the housing to pass unfiltered water from the inlet through the filter media and to the outlet;
        a longitudinal axis; and
        at least one outwardly extending mounting lug configured to rotatably engage one of the plurality of flanges of the manifold during use, the at least one outwardly extending mounting lug has a deformable portion and a stop portion separated by axial distance d, the deformable portion being axially aligned with the stop portion during use in a direction along the longitudinal axis away from the distal end of the filter cap, the deformable portion being configured so it does not permanently deform below a rated pressure Y of the water filter cartridge during use but does permanently deform at a pressure in the filter cartridge above that rated pressure Y, the rated pressure Y being greater than pressure X and below a qualification pressure Z that is at least about twice the pressure X but less than 10 times the pressure Z.

2. The water filter cartridge of claim 1, wherein the deformable portion permanently deforms at a pressure between about 100 psi and about 200 psi in the water filter cartridge.

3. The water filter cartridge of claim 1, wherein the deformable portion permanently deforms at a pressure between about 100 psi and about 300 psi in the water filter cartridge.

4. The water filter cartridge of claim 1, wherein the distance d is about 0.03 to about 0.045 inches and the deformable stop is made of polyethylene.

5. The water filter cartridge of claim 1, wherein the deformable and stop portions extend circumferentially the same distance.

6. The water filter cartridge of claim 1, wherein the deformable and stop portions are made of polyethylene.

7. The water filter cartridge of claim 1, wherein the qualification pressure Z is less than five times the line pressure X.

8. The water filter cartridge of claim 1, wherein the deformable and stop portions each have a leading end and at least one of those leading ends is inclined in a direction to help the deformable portion mate with one of the plurality of flanges during use.

9. The water filter cartridge of claim 1, wherein the deformable portion connects to the filter cap at a radial distance that is greater than where the stop portion connects to the filter cap.

10. The water filter cartridge of claim 1, wherein the distance between the deformable and stop portions is between about 0.02 and 0.04 inches.

11. The water filter cartridge of claim 1, wherein the distance between the deformable and stop portions is between about 0.025 and 0.035 inches.

* * * * *